United States Patent [19]
Berke et al.

[11] 3,873,757
[45] Mar. 25, 1975

[54] COMMUNICATIONS CIRCUIT PROTECTOR

[75] Inventors: Lawrence Richard Berke, Miramar, Fla.; John Alan De Ritter, Wayne, N.J.

[73] Assignee: Bell Telephone Laboratories Incorporated, Murray Hill, N.J.

[22] Filed: Apr. 8, 1974

[21] Appl. No.: 458,870

[52] U.S. Cl. .............................. 174/52 R, 174/65 R
[51] Int. Cl. ............................................. H05k 5/00
[58] Field of Search ........... 174/50, 52 R, 52 S, 59, 174/60, 65 R, 65 SS, 65 G; 317/120

[56] References Cited
UNITED STATES PATENTS

| | | | |
|---|---|---|---|
| 1,131,399 | 3/1915 | McGinley | 174/65 R |
| 2,454,962 | 11/1948 | Brown | 174/12 |
| 2,455,704 | 12/1948 | Schultz | 200/150 |
| 2,852,714 | 9/1958 | Baxter | 313/243 |
| 2,859,390 | 11/1958 | Baker | 174/59 X |
| 3,304,361 | 2/1967 | Sharp | 174/59 X |
| 3,310,712 | 3/1967 | Paddock | 317/120 |
| 3,484,535 | 12/1969 | Luchetta | 174/52 R |
| 3,519,726 | 7/1970 | Ewing | 174/65 R |

Primary Examiner—J. V. Truhe
Assistant Examiner—D. A. Tone
Attorney, Agent, or Firm—A. D. Hooper

[57] ABSTRACT

A waterproof protector housing includes a circular base with an upstanding wall thereabout and a circular flange within the wall and spaced therefrom to define inner and outer chambers. Electrical protection devices can be mounted on standoffs within the inner chamber and screws within the outer chamber mount the housing to a support. Service wires access the protection devices through a wire entrance through the wall and flange which is sealed against moisture by a grommet or a suitable gel or both to provide a reusable entrance. A cover mounts over the base and includes a sealing gasket thereon which is compressed against the top of the flange by a cam-locking action to completely seal the inner chamber from the outer chamber or environment when the cover is installed.

8 Claims, 6 Drawing Figures

PATENTED MAR 25 1975

COMMUNICATIONS CIRCUIT PROTECTOR

BACKGROUND OF THE INVENTION

1. Field of the Invention

This invention relates to electrical protectors for communication circuits and the like, and more particularly to an improved housing for such protectors.

2. Description of the Prior Art

Electrical circuit protectors are often installed in environments such as coastal areas which can cause corrosion and rapid deterioration of protectors and associated wire connections exposed thereto. Unfortunately most of the existing housings in which protectors are mounted do not provide adequate seals against the entry of water and other degrading matter in such environments and thus the protectors and connections thereto must be replaced frequently. Insects and vermin can also enter most existing housings and degrade the protectors and connections therein. A commonly used housing for protectors comprises a back plate which is mounted to a suitable support by mounting screws and on which the protectors are mounted. A face plate is mounted over the protectors by a screw. Water, insects, and other degrading matter mentioned above can enter such a housing through the mounting screw holes as well as through the junction between the plates and through the wire entrance ports. Other presently known housings also admit water and the like through one or more of the entrances mentioned. Accordingly, it is an object of this invention to improve the housings for electrical protectors to prevent degrading substances such as water and vermin from entering and contacting protectors mounted therein.

SUMMARY OF THE INVENTION

The foregoing objects and others are achieved in accordance with this invention by a housing which includes a substantially circular base with an upstanding wall thereabout and a flange within the wall and spaced therefrom to define inner and outer compartments or chambers. Electrical protection devices can be mounted on standoffs within the inner chamber and screws through the outer chamber can mount the housing to a support. Service wires access the protection devices through a wire entrance through the wall and flange which is sealed against moisture by a prepierced grommet or a suitable gel or both to provide a reusable entrance. A cover mounts over the base and includes a sealing gasket thereon which is compressed against the top of the flange by a cam locking action to completely seal the inner chamber from the outer chamber or the environment when the cover is installed.

BRIEF DESCRIPTION OF THE DRAWING

The invention will be more fully comprehended from the following detailed description and accompanying drawing in which.

DETAILED DESCRIPTION

Figure 1:
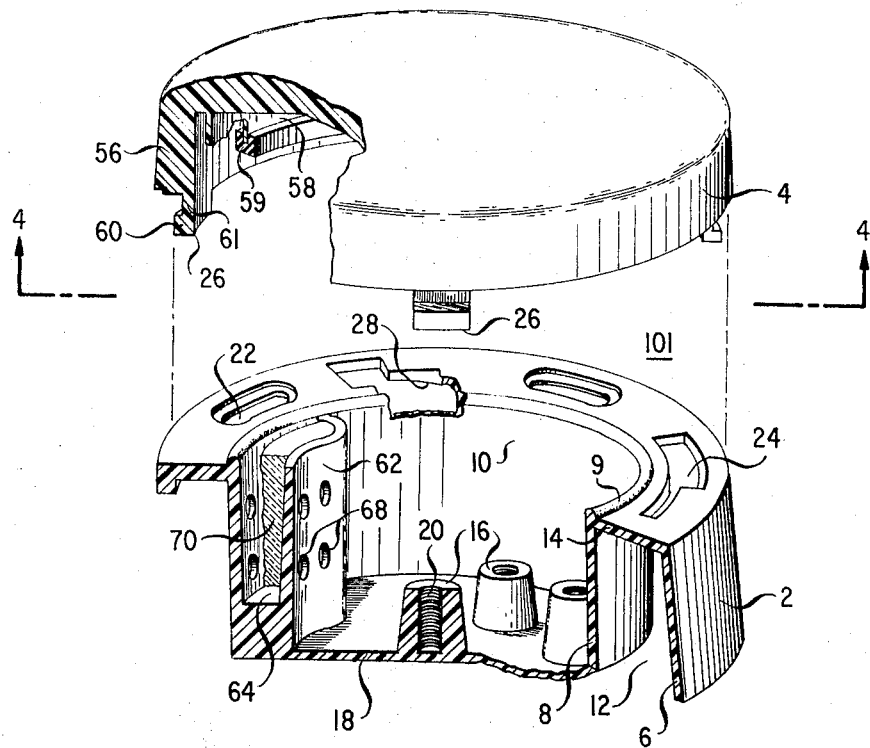
FIG. 1 is an exploded perspective view partly in section of one embodiment of a protector housing in accordance with this invention.

Referring now to FIG. 1 there is shown a protector housing 101 in accordance with this invention comprising a base 2 and a mating cover 4 having substantially circular configurations. Base 2 includes an outer wall 6 and a substantially concentric inner wall or upstanding flange 8 which divide base 2 into inner and outer compartments or chambers 10 and 12, respectively. A flange or shelf 14 joins walls 6 and 8 along the top thereof with the edge of wall 8 extending a short distance above flange 14 for purposes to become more apparent subsequently. Base 2 and cover 4 advantageously are formed as by molding from a suitable material such as a rigid polyvinyl chloride plastic which meets Underwriters Laboratories' requirements for fire hazard and corrosion protection.

Within inner chamber 10 are a plurality of standoffs or mounting studs 16 upstanding from the floor or bottom wall 18 of base 2. Studs 16 can have threaded holes 20 extending partially therethrough by means of which protectors can be mounted thereon by well-known mounting hardware. Alternatively, studs 16 can have plain unthreaded holes adapted to receive a thread-rolling screw or the like therein for mounting protectors thereon. It should be apparent that none of the holes 20 or any other openings extend through floor 18 but rather floor 18 presents a solid surface within the boundaries of inner chamber 10 as viewed from the exterior or underside of base 2. Thus no water or any other foreign matter can enter chamber 10 through wall 18.

Flange or shelf 14 includes a plurality of elongated generally elliptical openings 22 and a plurality of generally "L-shaped" openings 24 therethrough communicating with outer chamber 12 which is open at the bottom thereof in the plane of floor 18. In the illustrative embodiment four of each of openings 22 and 24 are placed in flange 14. Openings 22 are adapted for receiving mounting screws or bolts therethrough by which base 2 can be mounted to a suitable support such as a wall or mounting plate. Openings 22 are outside inner chamber 10 where the protectors are mounted. Thus foreign substances cannot access the protectors through mounting holes or openings 22 as is the case with existing protector housings. Openings 24 are adapted to receive mating lugs or flanges 26 from cover 4 therein for mounting cover 4 to base 2 as will be discussed in more detail subsequently. Openings 24 include a tapered, inclined or cam surface 28 on the underside of flange 14 alongside the narrow portion or leg 30 thereof.

Figure 2:
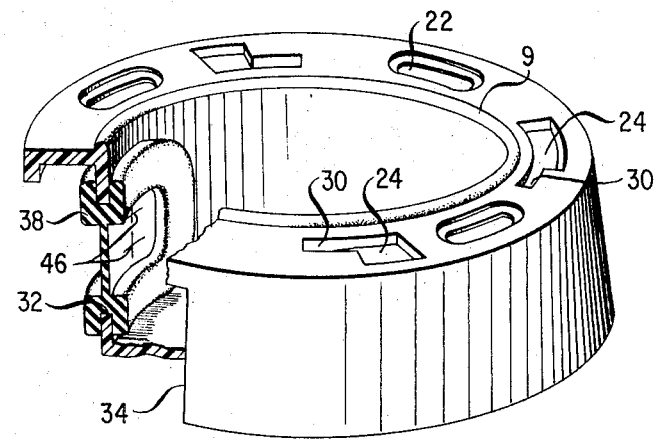
FIG. 2 is a perspective view partly in section of a second embodiment of a base for the protector housing.
Figure 3:
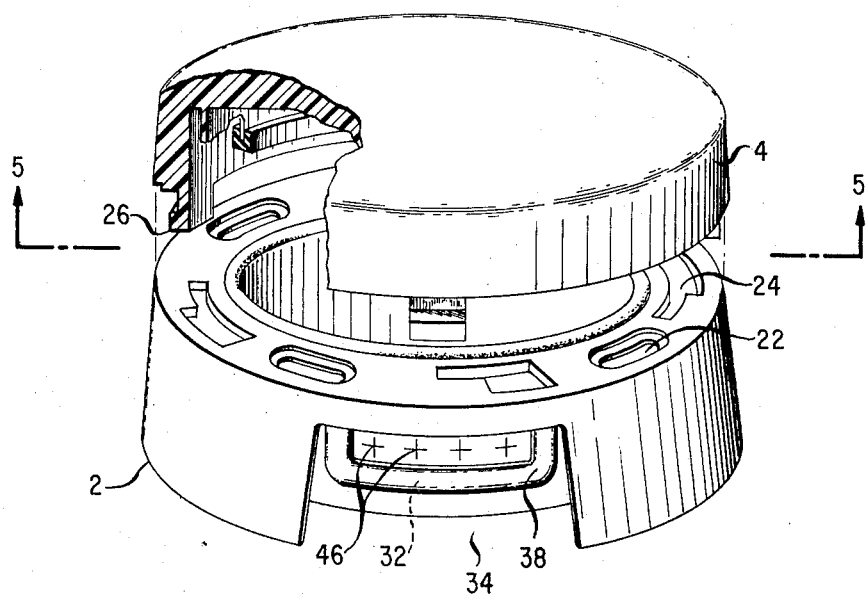
FIG. 3 is an exploded perspective view partly in section of the second embodiment of the housing showing the wire entrance more clearly.
Figure 5:
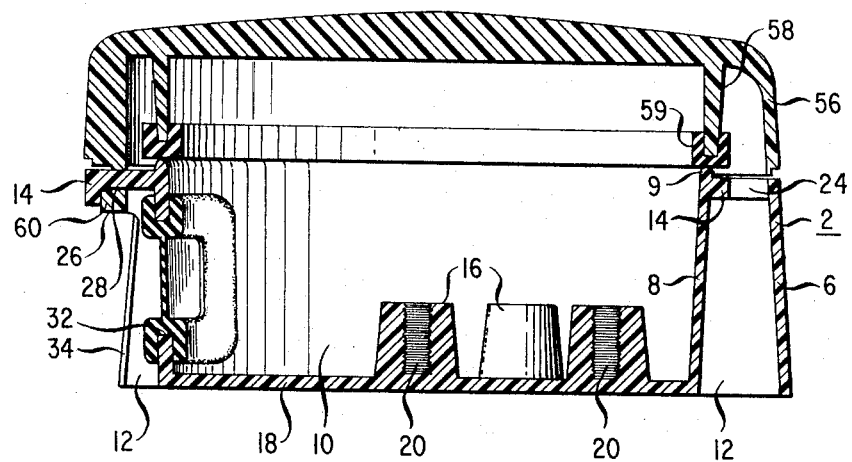
FIG. 5 is a sectional view along line 5—5 of FIG. 3.
Figure 6:
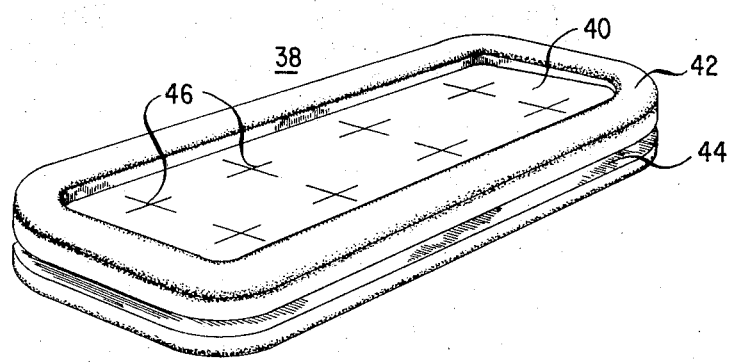
FIG. 6 is a perspective view of a grommet for use in one embodiment.

In one embodiment of the housing shown in FIGS. 2, 3 and 5, inner annd outer walls 8 and 6, respectively, include aligned openings 32 and 34 therethrough at one location about their respective perimeters. These aligned openings which comprise the only entrance into inner chamber 10 when cover 4 is installed serve as an entrance for service wires or other conductors which are to be connected to the protectors within chamber 10. This entrance is advantageously sealed against the entry of water and other foreign matter therethrough by a sealing means which provides a "reusable" entrance for wires, i.e., wires can be inserted therethrough and removed a plurality of times without degrading the seal provided against the entry of foreign substances. In this embodiment the sealing means is a pre-pierced grommet 38 as shown in detail in FIG. 6 which can be made of a suitable flexible material such as silicone rubber. Grommet 38 includes a central planar portion 40 surrounded by a thicker border 42. Border 42 includes a groove or slot 44 around the periphery thereof in which the periphery of opening 32 of wall 8 fits to hold grommet 38 in place and to provide a seal. Planar portion 40 includes a plurality of locations 46 which have been pierced such as by forming two intersecting slits therein without the removal of any material. When wires are run through these pierced locations 46, grommet 38 will fit snugly thereabout and prevent the entry of water or other matter along the wires into chamber 10. When the wires are removed the pierced locations 46 close so as to become almost invisible and remain sealed against the entry of water until reused.

Figure 4:
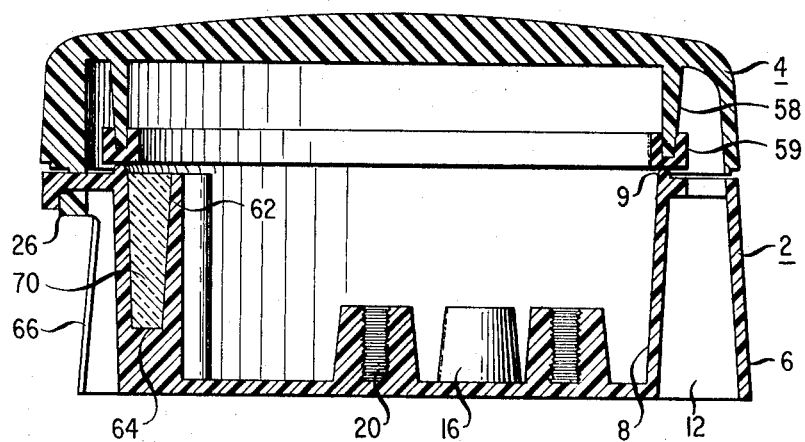
FIG. 4 is a sectional view along line 4—4 of FIG. 1.

In another embodiment of the invention as shown in FIGS. 1 and 4, a wall or partition 62 extends from the inner surface of wall 8 so as to define a small compartment or chamber 64 along the inner surface of wall 8. Outer wall 6 has a cutout or opening 66 aligned with this compartment. Walls 8 and 62 include a plurality of aligned openings or holes 68 therethrough by which wires inserted through cutout 66 can enter inner chamber 10. Holes 68 are slightly larger than the wires expected to be connected to the protectors mounted in chamber 10. A variety of hole sizes can be provided if desired.

A plug or layer 70 of flexible waterproof dielectric material is mounted in chamber 64 and seals the entrances formed by openings or holes 68. One material suitable for such application is a dielectric gel available from Dow Corning Corporation as catalog No. F-1-3523. Such a material has a jello-like consistency which allows wires to be inserted therethrough and removed therefrom while clinging closely to such wires to prevent the entrance of water therealong and resealing upon the removal of the wires.

In still another embodiment, the combination of a grommet and a flexible dielectric gel as described above could be used. In such a design, holes 68 in wall 8 of FIG. 1 would be replaced by a cutout 32 such as shown in FIG. 2 in which a grommet is mounted.

Cover 4 of housing 101 includes outer and inner walls 56 and 58, respectively, which are substantially aligned with walls 6 and 8, respectively, of base 2 when cover 4 is installed thereon. Cover 4 includes a plurality of lugs 26, previously mentioned, depending therefrom at angular spacings corresponding with the angular spacings of openings 24. Lugs 26 are adapted to be installed in openings 24 so that lip 60 thereon lies under cam surface 28 of openings 24. Thus after cover 4 has been placed in position on base 2, the rotation of cover 4 with respect to base 2 causes neck portion 61 of lug 26 to move along leg or slot 30 of opening 24 while lip 60 rides along cam surface 28 to draw cover 4 toward base 2 into a tightly registered position. Cover 4 includes a flexible gasket or seal 59 such as a circular rubber gasket having a u-shaped cross section around the bottom edge of depending wall 58. This gasket 59 contacts the top, upstanding tip 9 of inner wall 8 of base 2 which extends above flange 14 as previously indicated. As cover 4 is drawn toward base 2 by the cam action of lip 60 moving along surface 28 as previously discussed, seal 59 is tightly compressed between the edges of walls 8 and 58 thereby effectively sealing inner chamber 10 from outer chamber 12 and the environment to which outer chamber 12 is exposed. The cam action also allows cover 4 to be installed on base 2 by a simple one-hand twisting action without the use of any screws or similar mounting hardware as required by presently used housings.

It should be apparent from the foregoing that when cover 4 is installed on base 2 by the cam-lock action, there is no entrance by which water or other foreign substance can enter inner chamber 10 to degrade any protectors mounted thereon. There are no mounting holes through floor 18 in chamber 10 but rather the mounting holes 22 are in outer chamber 12. Cover 4 is sealed to base 2 by the compression of seal 59 during the cam-locking rotation. The wire entrance through the walls of base 2 is sealed by one of the means discussed. Accordingly, housing 101 provides a sealed, easily installed housing for protectors mounted within inner chamber 10.

While the invention has been described with reference to specific embodiments thereof, it is to be understood that various modifications may be made thereto without departing from its spirit and scope. For example, since outer chamber 12 is exposed to the environment, outer wall 6 could be removed and mounting holes 22 replaced by holes in external flanges extending outward from inner wall 8. Also the cam-lock mounting arrangement for cover 4 could be replaced by a spring-lock arrangement wherein cantilevered springs on base 2 are placed over cover 4 to hold it in sealing engagement with base 2. Cover 4 could also be mounted to base 2 by a screw and thread arrangement.

What is claimed is:

1. A communications circuit protector comprising, in combination:
    an insulative base having a first wall thereabout;
    a second wall joined to said base and spaced inwardly from said first wall to define inner and outer chambers within said second wall and between said first and second walls, respectively, said first and second walls having aligned openings therethrough to define a wire entrance into said inner chamber;
    means within said inner chamber for mounting protector devices therein;
    a sealing means sealing said entrance and adapted to receive wires therethrough to access said inner chamber while providing a seal about said wires to prevent moisture from passing through said entrance;
    a flange joining said walls along the top edges thereof and including first and second openings therethrough, said first openings being adapted to receive mounting means therethrough for passing through said outer chamber and mounting said base; and
    a cover having locking means thereon engaging said second openings in said flange for fastening said cover to said base, said cover including a seal contacting said top edge of said second wall to seal said inner chamber from said outer chamber.

2. Apparatus in accordance with claim 1 wherein said second opening includes a cam surface along an edge thereof, and said locking means comprises a flange depending from said cover and slideably fitting within said second opening to permit rotation of said cover with respect to said base, said flange including a lip thereon engaging said cam surface so that said cover can be drawn toward said base by rotating said cover to move said lip along said cam surface.

3. Apparatus in accordance with claim 1 wherein said sealing means comprises a grommet of flexible material mounted within said entrance and having a plurality of pierced locations therein.

4. Apparatus in accordance with claim 1 wherein said sealing means comprises a plug of flexible, dielectric gel sealing said entrance.

5. Apparatus in accordance with claim 1 wherein said sealing means comprises a grommet of flexible material and a plug of flexible dielectric gel mounted in said entrance.

6. Apparatus in accordance with claim 1 wherein said cover includes first and second flanges depending therefrom substantially in alignment with said first and second walls, respectively, and said seal comprises a gasket of flexible material mounted about the bottom edge of said second flange and contacting said top edge of said second wall to be compressed between said edges of said second flange and said second wall.

7. Apparatus in accordance with claim 1 wherein said means for mounting said protector devices comprises upstanding studs having threaded holes therein.

8. A communications circuit protector comprising, in combination:

an insulative base having an upstanding wall integrally formed thereabout to define an inner chamber, said wall having an opening therethrough to define a wire entrance into said inner chamber;

first mounting means within said inner chamber for mounting protector devices therein;

sealing means sealing said wire entrance and adapted for receiving wires therethrough to access said inner chamber while providing a seal about said wires;

second mounting means about the exterior of said wall for mounting said base to a support without requiring access to said inner chamber;

a cover adapted for mounting over said base and forming a seal with said wall to seal said inner chamber; and means detachably mounting said cover to said second mounting means over said base.

* * * * *